United States Patent
Ophir et al.

(10) Patent No.: US 9,831,488 B1
(45) Date of Patent: Nov. 28, 2017

(54) IN-BATTERY POLYMERIZATION OF CONDUCTING POLYMERS FOR HIGH-RATE CHARGING CATHODES

(71) Applicant: Storedot Ltd., Herzeliya (IL)

(72) Inventors: Carmit Ophir, Holon (IL); Libi Brakha, Tel Aviv (IL); Doron Burshtain, Herzliya (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 15/434,083

(22) Filed: Feb. 16, 2017

Related U.S. Application Data (60) Provisional application No. 62/432,588, filed on Dec. 11, 2016.

(51) Int. Cl.

| | |
|---|---|
| *H01M 4/04* | (2006.01) |
| *H01M 4/136* | (2010.01) |
| *H01M 4/58* | (2010.01) |
| *H01M 4/583* | (2010.01) |
| *H01M 4/62* | (2006.01) |
| *H01M 4/60* | (2006.01) |
| *H01M 10/0525* | (2010.01) |
| *H01M 10/44* | (2006.01) |
| *C08G 61/12* | (2006.01) |
| *H01M 4/02* | (2006.01) |

(52) U.S. Cl.
CPC ........ *H01M 4/0445* (2013.01); *C08G 61/126* (2013.01); *H01M 4/136* (2013.01); *H01M 4/583* (2013.01); *H01M 4/5825* (2013.01); *H01M 4/608* (2013.01); *H01M 4/623* (2013.01); *H01M 10/0525* (2013.01); *H01M 10/44* (2013.01); *C08G 2261/1424* (2013.01); *C08G 2261/18* (2013.01); *C08G 2261/228* (2013.01); *C08G 2261/3223* (2013.01); *H01M 2004/028* (2013.01)

(58) Field of Classification Search
CPC .. H01M 4/0445; H01M 4/5825; H01M 4/136; H01M 4/583; H01M 4/623; H01M 4/608; H01M 10/0525; H01M 10/44; H01M 2004/028; C08G 61/126; C08G 2261/228
See application file for complete search history.

(56) References Cited

U.S. PATENT DOCUMENTS

| | | |
|---|---|---|
| 8,685,566 B2 | 4/2014 | Schougaard et al. |
| 2011/0171371 A1 | 7/2011 | Li et al. |
| 2014/0065477 A1* | 3/2014 | Han ............ H01M 4/525 429/211 |

OTHER PUBLICATIONS

Lemos et al., "A new insight into the LiFePO4delithiation process", 2006, Solid State Ionics, vol. 177:pp. 1021-1025.
Julien et al., "Structural and Magnetic Properties of LiFePO4 and Lithium Extraction Effects", 2006, Z. Anorg. Allg. Chem., vol. 632: pp. 1598-1605.
Meng et al., "Intermittent X-Ray diffraction study of kinetics of delithiation in nano-scale LiFePO4", 2009, Journal of Power Sources, vol. 189: pp. 702-705.
Kim et al., "Towards flexible secondary lithium batteries: polypyrrole-LiFePO4 thin electrodes with polymer electrolytes", 2012, J. Mater. Chem., vol. 22, pp. 15045-15049.
Huang et al., "Improving Lithium Batteries by Tethering Carbon-Coated LiFePO4 to Polypyrrole", 2006. Journal of The Electrochemical Society, vol. 153 (12), pp. A2282-A2286.
Huang et al., "LiFePO4/polymer composite cathodes with high rate capability", 2007, 212th ECS Meeting, Abstract #110, The Electrochemical Society.
Posudievsky et al., "Advanced electrochemical performance of hybrid nanocomposites based on LiFePO4 and lithium salt doped polyaniline", 2015, J Solid State Electrochem, vol. 19 pp. 2733-2740.
Wang et al., "Electrochemical behavior of LiFePO4cathode materials in thepresence of anion adsorbents ", 2014, Electrochimica Acta vol. 130 pp. 532-536.
Cintora-Juarez et al.,"Electrochemical in battery polymerization of poly(alkylenedioxythiophene) over lithium iron phosphate for high-performance cathodes", 2014, vol. 16, pp. 20724-20730, PCCP.
Huang et al., "High-Rate LiFePO4 Lithium Rechargeable Battery Promoted by Electrochemically Active Polymers", 2008, vol. 20, pp. 7237-7241, American Chemical Society.
Park et al., "Conducting-Polymer/Iron-Redox-Couple Composite Cathodes for Lithium Secondary Batteries", 2007, Adv. Mater, vol. 19, pp. 848-851.

\* cited by examiner

*Primary Examiner* — Laura Weiner
(74) *Attorney, Agent, or Firm* — Pearl Cohen Zedek Latzer Baratz LLP (57) ABSTRACT

Cathodes for a fast charging lithium ion battery, processes for manufacturing thereof and corresponding batteries are provided. Cathode formulations comprise cathode material having an olivine-based structure, binder material, and monomer material selected to polymerize into a conductive polymer upon partial delithiation of the cathode material during at least a first charging cycle of a cell having a cathode made of the cathode formulation. When the cathode is used in a battery, polymerization is induced in-situ (in-cell) during first charging cycle(s) of the battery to provide a polymer matrix which is evenly dispersed throughout the cathode.

13 Claims, 7 Drawing Sheets

IN-BATTERY POLYMERIZATION OF CONDUCTING POLYMERS FOR HIGH-RATE CHARGING CATHODES

CROSS REFERENCE TO RELATED APPLICATIONS

This application claims the benefit of U.S. Provisional Patent Application No. 62/432,588, filed Dec. 11, 2016, which is hereby incorporated by reference.

BACKGROUND OF THE INVENTION

1. Technical Field

The present invention relates to the field of batteries, and more particularly, to cathodes for fast charge lithium ion batteries.

2. Discussion of Related Art

Rechargeable lithium batteries are extensively used for portable electronic devices as well as hybrid electronic vehicles. The cell capacity and rate capability as well as safety, environmental compatibility, life cycle, and cost are among the commercial considerations in preparing and using various types of batteries. The olivine $LiFePO_4$ (LFP) cathode material is known to be low-cost, safe, environmentally benign, and further, provides beneficial cyclability and large capacity at high rates of charge and discharge. It is noted that the LFP particles used are of nano-scale and/or are coated with carbon; due to poor kinetic response of electronic and $Li^+$-ion transfer under rapid-rate conditions.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a cathode formulation comprising cathode material having an olivine-based structure, binder material, and monomer material selected to polymerize into a conductive polymer upon partial delithiation of the cathode material during at least a first charging cycle of a cell having a cathode made of the cathode formulation.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

It is noted that the disclosed general formulas relate to the stoichiometry of the material, which may vary by a few percent from the stoichiometry due to substitution or other defects present in the structure.

Cathodes for a fast charging lithium ion battery, processes for manufacturing thereof and corresponding batteries are provided. Cathode formulations comprise cathode material having an olivine-based structure, binder material, and monomer material selected to polymerize into a conductive polymer upon partial delithiation of the cathode material during at least a first charging cycle of a cell having a cathode made of the cathode formulation. When the cathode is used in a battery, polymerization is induced in-situ (in-cell) during first charging cycle(s) of the battery to provide a polymer matrix which is evenly dispersed throughout the cathode. The disclosed cathodes may be used in any energy storage device.

Figure 1:
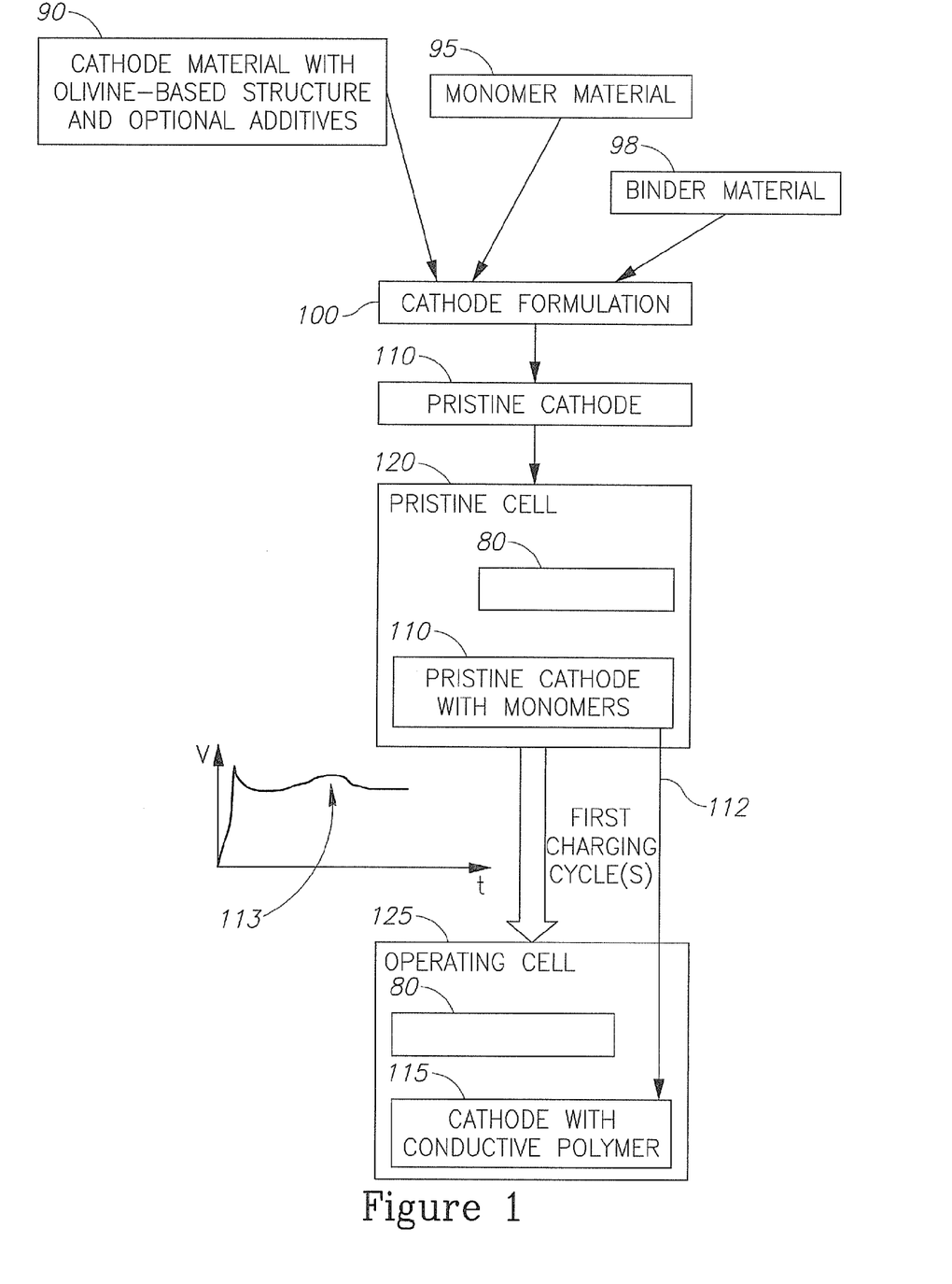
FIG. 1 is a high level schematic illustration of cathode formulations, cathodes and cells, according to some embodiments of the invention.

FIG. 1 is a high level schematic illustration of cathode formulations 100, cathodes 110, 115 and cells 120, 125, according to some embodiments of the invention.

Cathode formulations 100 comprise cathode material 90 having an olivine-based structure (and optional additives, see below), binder material 98, and monomer material 95 selected to polymerize into a conductive polymer upon partial delithiation of cathode material 90 during at least a first charging cycle of cell 120, 125 having cathode 110, 115 made of cathode formulation 100. Pristine cathode 110 and pristine cell 120 denote for example cathodes and cells prior to their first charging cycle, while cathode 115 and operating cell 125 denote for example cathodes and cells after their first charging cycle has been carried out. Dried cathode slurries made of cathode formulations 100 are likewise part of the present disclosure. It is noted that similar configurations may be applied to other electrodes and are shown here for cathodes as a non-limiting example.

Cathode formulations 100 may comprise cathode material 90 consisting of $A_zMXO_4$, wherein A is Li, alone or partially replaced by at most 10% of Na and/or K; $0 \leq z \leq 1$; M is at least 50% of Fe(II) or Mn(II) or mixture thereof; and $XO_4$ is $PO_4$, alone or partially replaced by at most 10 mol % of at least one group selected from $SO_4$ and $SiO_4$. For example, cathode material 90 may include LFP ($LiFePO_4$) cathode material. Cathode material 90 may further comprise additives such as conductive materials, e.g., carbon black and/or carbon nano-tubes. Cathode formulations 100 may comprise a carbon coating.

In certain embodiments M may be selected from Fe(II), Mn(II) and mixtures thereof, alone or partially replaced by at most 50% of one or more other metals selected from Ni and Co and/or by at most 15% of one or more aliovalent or isovalent metals other than Ni or Co, and/or by at most 5% as atoms of Fe(III).

In certain embodiments, M may be selected from Fe(II), Mn(II) and mixtures thereof, alone or partially replaced by at most 50% of one or more other metals chosen from Ni and Co and/or by at most 15% as atoms of one or more aliovalent or isovalent metals selected from Mg, Mo, Nb, Ti, Al, Ta, Ge, La, Y, Yb, Cu, Sm, Ce, Hf, Cr, Zr, Bi, Zn, Ca, B and W and/or by at most 5% as atoms of Fe(III).

In certain embodiments, cathode material 90 may comprise a compound corresponding to the general formula $Li_zFe_yMn_{1-y}PO_4$ which has an olivine structure, wherein z and y are each independently between 0 and 1 (e.g., A may be Li, M may be $Fe_yMn_{1-y}$, X may be P, $0 \leq z \leq 1$, $0 \leq y \leq 1$, independently).

Cathode formulations 100 may comprise monomer material 95 consisting of monomers of any of pyrrole, aniline, thiophene, phenyl mercaptan, furan, and phenol. In certain embodiments, monomer material 95 may comprise oligomers, at least as part of monomer material 95. In certain embodiments, monomer material 95 may comprise ethylenedioxythiophene and styrenesulfonate which may polymerize to conductive polymer PEDOT-PSS (Poly(3,4-ethylenedioxythiophene)-poly(styrenesulfonate) upon partial delithiation of cathode material 90 during at least a first charging cycle of cell 120, 125. In certain embodiments, monomer material 95 may comprise combinations of monomers and/or oligomers. In certain embodiments, the rings in any of the monomer embodiments may be substituted with one or more straight, branched or bridged alkyl, alkenyl, oxa-alkyl, oxa-alkenyl, aza-alkyl, aza-alkenyl, thia-alkyl, thia-alkenyl, sila-alkyl, sila-alkenyl, aryl, aryl-alkyl, alkyl-aryl, alkenyl-aryl, dialkylamino and dialkylazo compounds comprising about 1-30 carbon atoms.

Cathode formulations 100 may comprise binder material 98 such as carboxymethyl cellulose (CMC), polyvinylidene difluoride (PVDF), polyacrylic acid (PAA), polyethylene oxide (PEO), polyvinyl alcohol (PVA) and/or alginate as non-limiting examples.

Some embodiments comprise cathode formulations 100 having 80-90% of cathode material 90, 1-10% of binder material 98 and 1-10% of monomer material 95. Some embodiments comprise cathode formulations 100 having 90-98% of cathode material 90, 1-5% of binder material 98 and 1-5% of monomer material 95. In certain embodiments, cathode formulations 100 may comprise more than 90% of cathode material 90. In certain embodiments, cathode formulations 100 may comprise more than 10% of binder material 98. In certain embodiments, cathode formulations 100 may comprise more than 10% of monomer material 95. Some embodiments comprise any sub-range of weight % combinations within the disclosed ranges.

Cells 120, 125 may comprise cathodes 110, 115 prepared from cathode formulations 100, as well as an anode, electrolyte and a separator (illustrated collective and schematically by a member 80 in the cell). Pristine cathode 110 is prepared from cathode formulations 100, e.g., by spreading and drying, with cathode material 90 having an olivine-based structure, binder material 98, and monomer material 95, while cathode 115 has a conductive polymer formed during at least a first charging cycle of cell 120, 125 from monomer material 95. Without being bound by theory, it is suggested that the polymerization of monomer material 95 into the conductive polymer is carried out upon partial delithiation of cathode material 90 during the first cycle(s) of charging and discharging cell 120, 125. As the polymerization probably occurs during first charging cycle(s), it is referred to herein as in-situ, or in-cell polymerization, in contrast to prior art cathodes which are polymerized before being incorporated in operating cell 125.

Figure 2A:
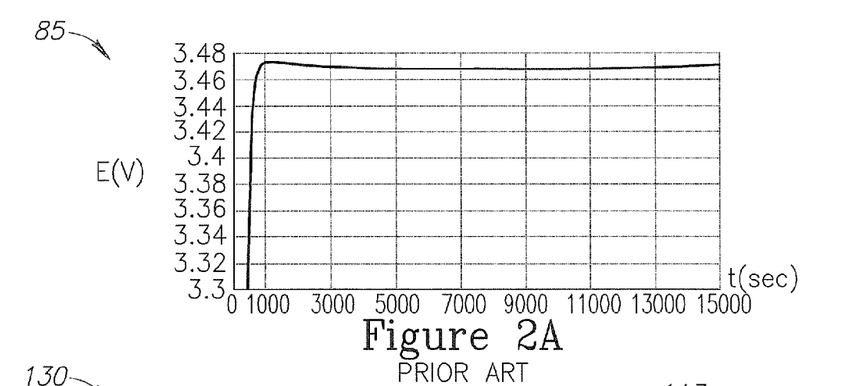
FIGS. 2A-2C illustrate examples for a prior art charging curve (FIG. 2A), a first cycle of a charging curve of the pristine cell with the pristine cathode having pyrrole monomers as monomer material (FIG. 2B), and a potential curve of the pristine cathode having pyrrole monomers as monomer material which is surface polymerized outside cell, as comparison (FIG. 2C), according to some embodiments of the invention.
Figure 2B:
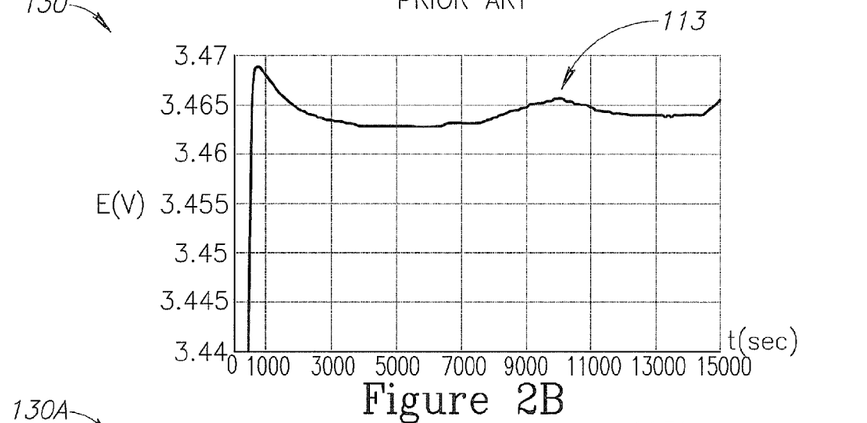
Figure 2C:
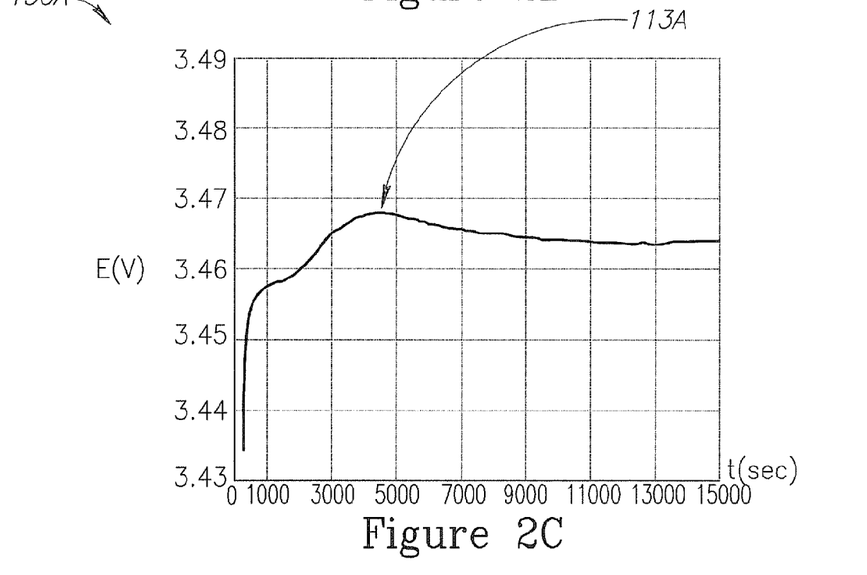

Without being bound by theory, an indication to the occurrence of the polymerization process during the charging process is illustrated schematically by peak 113 in FIG. 1 and is further illustrated in examples provided in FIGS. 2A-2C. FIGS. 2A-2C illustrate examples for a prior art charging curve 85 (FIG. 2A), a first cycle of a charging curve 130 of pristine cell 120 with pristine cathode 110 having pyrrole monomers as monomer material 95 (FIG. 2B) and a potential curve 130A of pristine cathode 110 having pyrrole monomers as monomer material 95 which is surface electropolymerized outside cell 120 (FIG. 2C), as comparison, according to some embodiments of the invention. While in prior art charging 85 the measured cathode potential is monotonous after the initial rise, charging curve 130 shows a clear local peak 113 in the potential at around 3.465V which is understood as corresponding to the polymerization of monomer material 95 in cathode 110 in cell 120 during actual charging, once sufficient partial delithiated cathode material has formed during the charging, as indicated by the potential value. This understanding was corroborated by identifying a peak 113A at a similar potential value under surface polymerization of another cathode 110 outside cell 120. The inventors suggest that, without being bound by theory, local peak 113 in charging curve 130 indicates the specified potential which corresponds to a polymerization reaction of monomer material 95 in presence of the partially delithiated cathode material (e.g., by oxidation). It is noted that peak 113 is reduced and/or vanishes in later cycles, probably due to the completion of the polymerization. In different experiments, local peal 113 was found between 3.455V-3.465V. It is noted that cathodes 115 may be made operable by polymerization of monomer material 95 during the first cycle(s) even if local peal 113 is not visible on the charging curve, possibly due to cycling conditions and cathode composition. The presence of peak 113 is merely understood as a non-limiting indicator of the polymerization process, and not as a required condition thereto.

Figure 3:
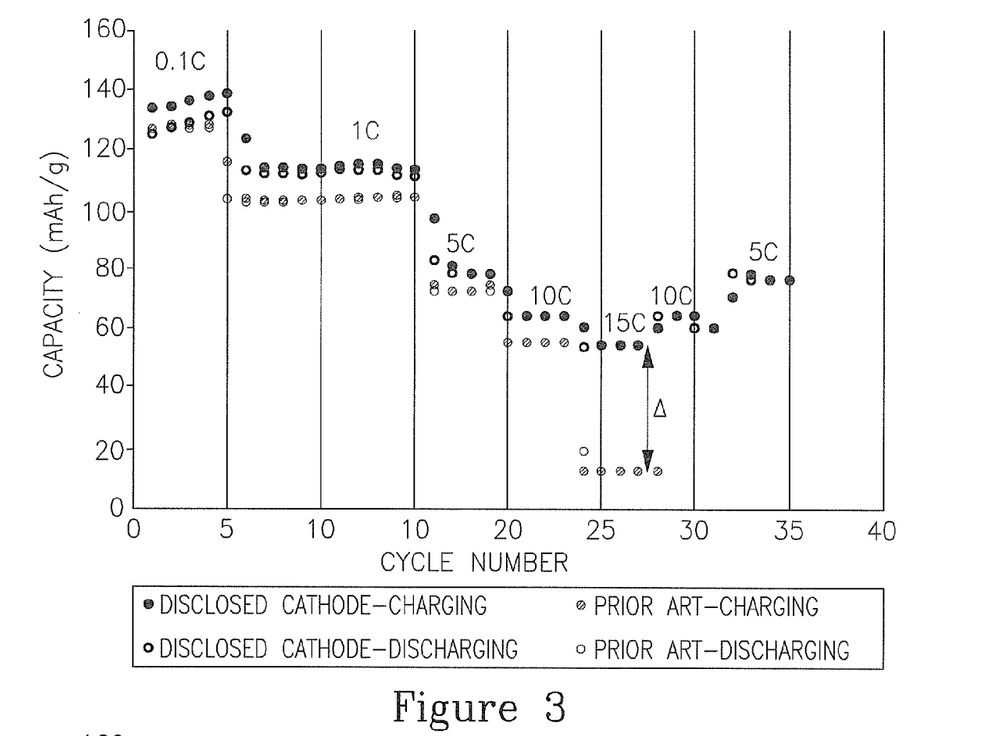
FIG. 3 is an illustration of an experimental comparison of cells with disclosed cathodes, with prior art cells having cathodes that lack the monomers, according to some embodiments of the invention.

FIG. 3 is an illustration of an experimental comparison of cells 125 with disclosed cathode 115 with prior art cells having cathodes that lack the monomers, according to some embodiments of the invention. The cell capacity and cyclability are exemplified at charging/discharging rates of 0.1 C, 1 C, 5 C, 10 C and 15 C, illustrating the superior capacity of cells 125, particularly at high charging rates such as 15 C in which cells 125 achieved more than threefold the capacity of prior art cells (indicated by Δ in the figure).

Figure 4:
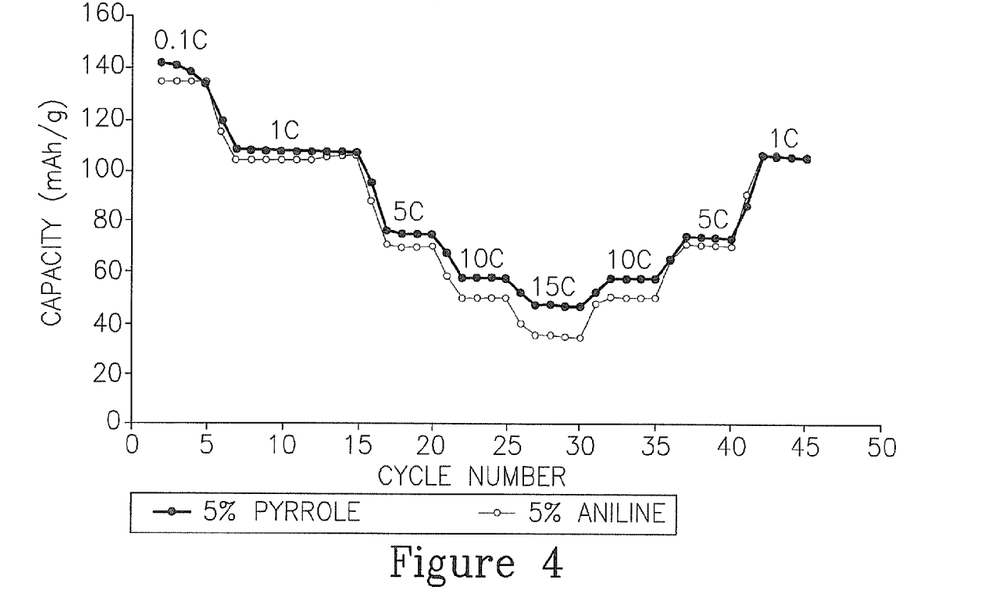
FIG. 4 is an illustration of an experimental comparison of cathodes having pyrrole as monomer material versus cathodes having aniline as monomer material, according to some embodiments of the invention.

FIG. 4 is an illustration of an experimental comparison of cathodes 115 having pyrrole as monomer material 95 versus cathodes 115 having aniline as monomer material 95, according to some embodiments of the invention. In both cases, monomer material 95 was added as 5% (weight %) of the cathode slurry and both cases show high capacities in all charging rates, and particularly at high charging rates such as 5 C, 10 C, 15 C and possibly higher charging rates.

Figure 5A:
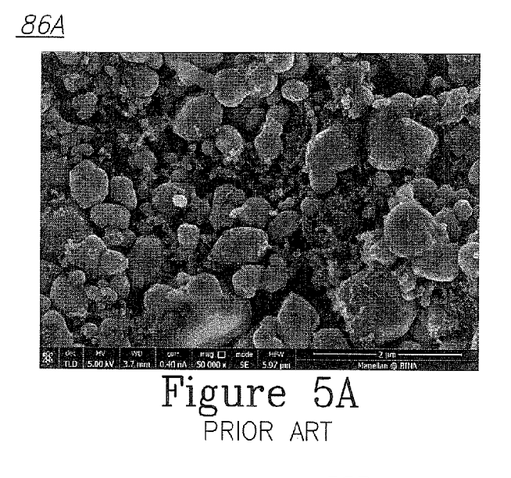
FIGS. 5A-5J are high resolution scanning electron microscope (HRSEM) images comparing prior art cathodes with pristine and operative cathodes respectively, according to some embodiments of the invention.
Figure 5B:
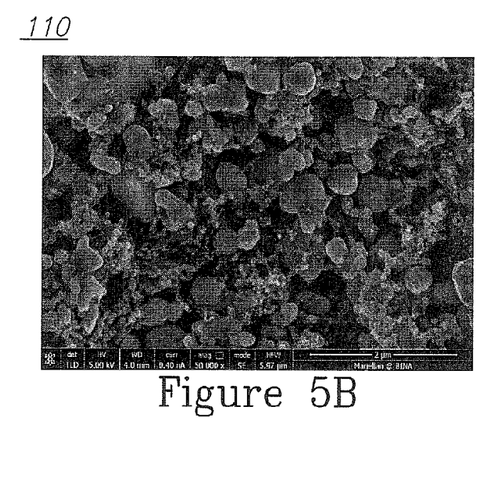
Figure 5C:
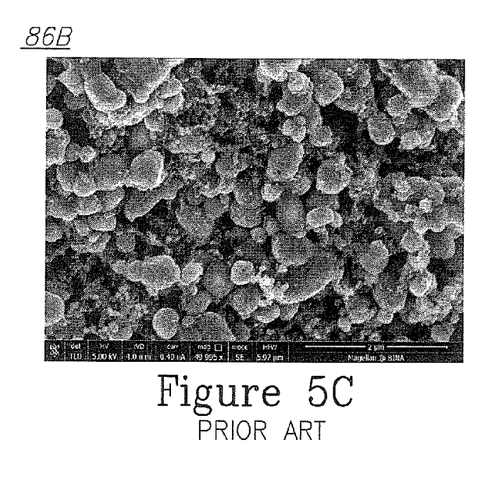
Figure 5D:
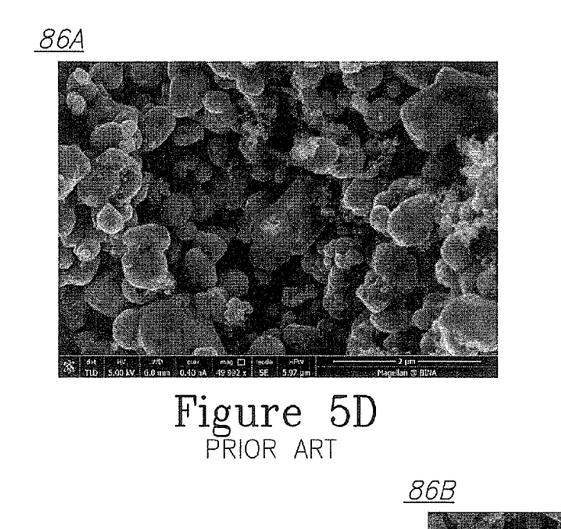
Figure 5E:
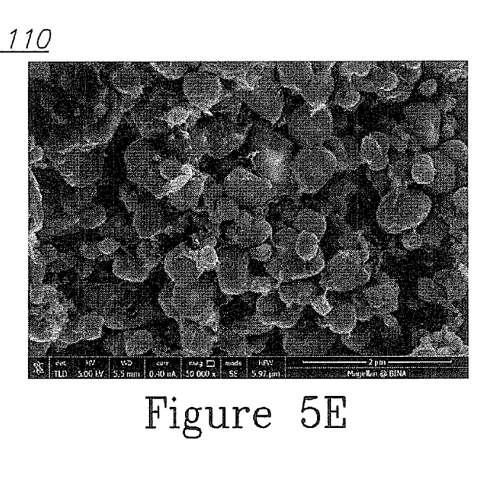
Figure 5F:
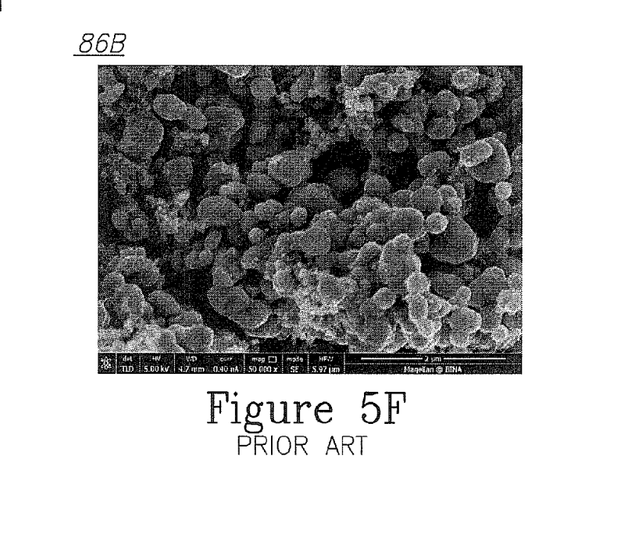
Figure 5G:
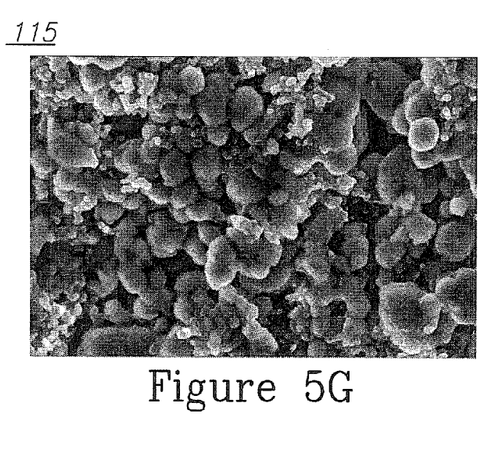
Figure 5H:
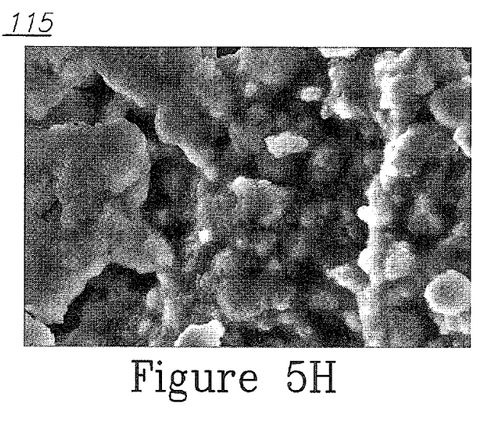
Figure 5I:
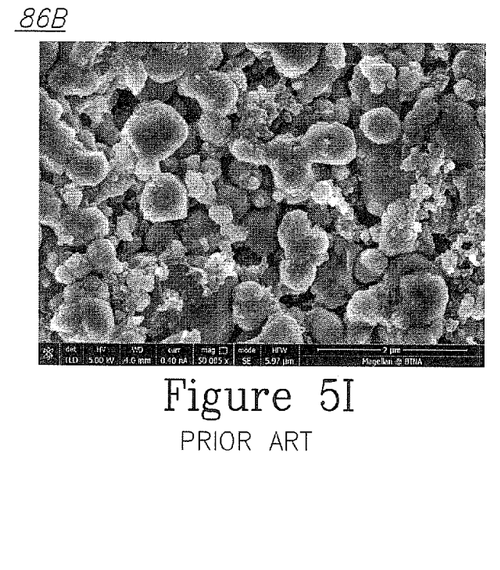
Figure 5J:
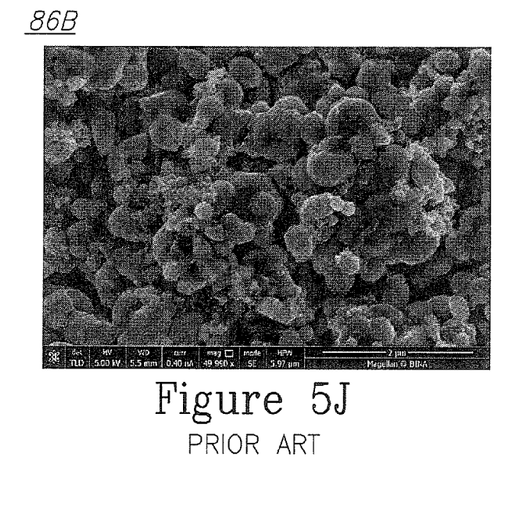

FIGS. 5A-5J are high resolution scanning electron microscope (HRSEM) images comparing prior art cathodes 86A, 86B with pristine and operative cathodes 110, 115, respectively, according to some embodiments of the invention. FIGS. 5A and 5C show surface HRSEM images of pristine prior art cathodes 86A (LFP) and 86B (LFP with polypyrrole, polymerized prior to the first cycle, added polymerized into the cathode slurry), respectively, and FIG. 5B is a surface HRSEM image of pristine cathode 110 (in the illustrated non-limiting example, LFP with pyrrole monomer material 95). FIGS. 5D and 5F show cross section HRSEM images of pristine prior art cathodes 86A and 86B, respectively, and FIG. 5E is a cross section HRSEM image of pristine cathode 110. FIGS. 5G and 5I show surface HRSEM images of operative cathode 115 and prior art cathode 86B, respectively. FIGS. 5H and 5J show cross section HRSEM of operative cathode 115 and prior art cathode 86B, respectively. Advantageously, the inventors have found out that the disclosed in-cell polymerization of monomer material 95 yields thick and uniform polymerization of polypyrrole through the whole cross section of electrode 115 (FIG. 5H), in stark contrast to prior art electrode 86B (FIG. 5J).

Figure 6:
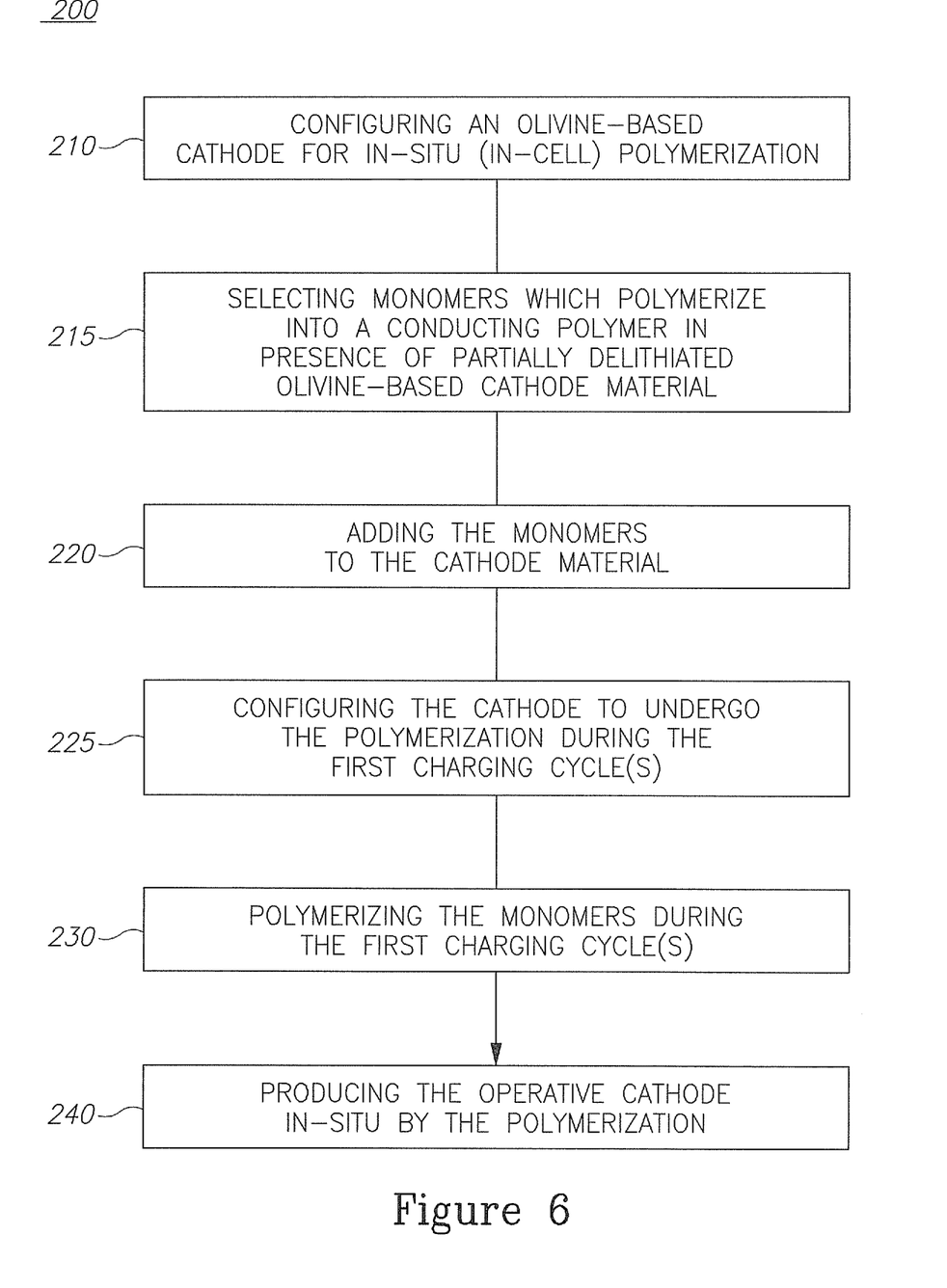
FIG. 6 is a high level schematic illustration of a method, according to some embodiments of the invention.

FIG. 6 is a high level schematic illustration of a method 200, according to some embodiments of the invention. The method stages may be carried out with respect to cathode formulations 100, cathodes 110, 115 and cells 120, 125 described above, which may optionally be configured to implement method 200. Method 200 may comprise stages for producing, preparing and/or using device cathode formulations 100, cathodes 110, 115 and cells 120, 125 described above, such as any of the following stages, irrespective of their order.

Method 200 may comprise configuring an olivine-based cathode for in-situ (in-cell) polymerization (stage 210), e.g., by selecting monomers which polymerize into a conducting polymer in presence of partially delithiated olivine-based cathode material (stage 215), adding the monomers to the cathode material (stage 220) configuring the cathode to undergo the polymerization during the first charging cycle(s) (stage 225), e.g., polymerizing the monomers during the first charging cycle(s) (stage 230) and producing the operative cathode in-situ by the polymerization (stage 240).

In certain embodiments, in cathode material 90 consisting of $A_zMXO_4$, wherein A is Li, alone or partially replaced by at most 10% of Na and/or K; $0 \leq z \leq 1$, M may be selected from Fe(II), Mn(II) and mixtures thereof, alone or partially replaced by at most 50% of one or more other metals selected from Ni and Co and/or by at most 15% of one or more aliovalent or isovalent metals other than Ni or Co, and/or by at most 5% as atoms of Fe(III) and $XO_4$ is $PO_4$, alone or partially replaced by at most 10 mol % of at least one group selected from $SO_4$ and $SiO_4$.

In certain embodiments, M may be selected from Fe(II), Mn(II) and mixtures thereof, alone or partially replaced by at most 50% of one or more other metals chosen from Ni and Co and/or by at most 15% as atoms of one or more aliovalent or isovalent metals selected from Mg, Mo, Nb, Ti, Al, Ta, Ge, La, Y, Yb, Cu, Sm, Ce, Hf, Cr, Zr, Bi, Zn, Ca, B and W and/or by at most 5% as atoms of Fe(III).

In certain embodiments, cathode material 90 may comprise a compound corresponding to the general formula $Li_zFe_yMn_{1-y}PO_4$ which has an olivine structure, wherein z and y are each independently between 0 and 1 (e.g., A may be Li, M may be $Fe_yMn_{1-y}$, X may be P, $0 \leq z \leq 1$, $0 \leq y \leq 1$, independently).

In certain embodiments, cathode material 90 may comprise a compound corresponding to the general formula $Li_zFePO_4$ which has an olivine structure, wherein $0 \leq z \leq 1$ (e.g., with M as Fe).

In certain embodiments, cathode material 90 may be a partially delithiated polymerization initiator with the formula $C-A_zMXO_4$, having on at least a portion of a surface thereof, a film of carbon (e.g., deposited by pyrolysis, as an additive to cathode material 90, coated on the surface, etc.). The film of carbon may be uniform, adherent and non-powdery. The film of carbon may be up to 15% of a weight of the polymerization initiator, or between 0.5%-5% of a weight of the polymerization initiator.

According to some embodiments, when the cathode is used in a battery comprising a current collector, a first charging cycle of the cathode causes polymerization initiator molecules (e.g., the partially delithiated $A_zMXO_4$) to induce polymerization of monomer material 95 incorporated in cathode 110, thereby providing a polymer matrix between cathode material 90 and the current collector (not shown) to which cathode 110 is attached. According to some embodiments, the polymerization process which occurs within the cathode may provide a polymer that is evenly dispersed throughout the cathode.

Introduction of electrochemically-active conducting polymers such as polypyrrole (PPy) and polyaniline (PAni) into LFP/C-LFP composite cathodes is known to enhance both the capacity and rate capability. The conductive polymers appear to provide good electronic contact between active particles themselves and with the current collector, and acts as a host material for $Li^+$ insertion/extraction. It has also been shown that the $Li^+$ diffusivity is greatly enhanced probably due to electrostatic attraction between the anions of the conducting polymer and $Li^+$ which can help $Li^+$ pull out of LFP particles. However, in the prior art, solutions concerning the incorporation of the conductive polymer are insufficiently effective or are industrially inapplicable. For example, prior art methods for preparing such composite cathodes include: (i) oxidative polymerization of the monomer in solution containing suspended oxide powders, wherein the prepared PPy-LFP particles are mixed with a binder and carbon to prepare the cathode; (ii) conventional fabrication by mixing the formerly synthesized polymer with oxide and the inactive additives (carbon and binder). The polymer can be synthesized chemically or electrochemically using the monomer as-is or following chemical modification for covalently attaching a redox couple, such as ferrocene; (iii) in-situ electrodeposition onto designated current collector (e.g., stainless-steel mesh) from suspension containing oxide particles and a monomer in an organic solvent (e.g., acetonitrile) via cyclic voltammetry—the resulted cathode may be used as-is without any additional binder or additives; (iv) in-battery electro-polymerization—an LFP cathode is closed in a coin-cell in the presence of a monomer dissolved in an electrolyte and the polymer is polymerized by either a single step of charging to induce de-lithiation of the cathode or by initial charge to induce de-lithiation followed by the addition of a monomer solution after which an additional galvanostatic step is performed to complete the polymerization, wherein the partially delithiated lithium metal phosphate acts as a polymerization initiator.

Advantageously, while prior art polymerization is carried out prior to the preparation of the cathode or prior to the insertion of the cathode into the cell, and typically from compound in the electrolyte or in a solution, disclosed cathodes 110 are prepared from slurries which include monomer material 95 and polymerization is carried out in cell 120, 125 without need for polymerization of monomer material 95 during the preparation of cathode 110, before introducing cathode 100 into cell 120. The disclosed invention thus provides significant process advantages as well as superior cathodes and cells, as explained above.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A cathode, prepared from a cathode formulation comprising:
   cathode material having an olivine-based structure,
   binder material, and
   monomer material selected to polymerize into a conductive polymer upon partial delithiation of the cathode material during at least a first charging cycle of a cell having the cathode,
   wherein:
   the monomer material is in monomer form in the cathode in its pristine form prior to the first charging cycle of the cell,
   the partial delithiation is carried out electrochemically during the first charging cycle of the cell,
   following the first charging cycle of the cell, the monomer material is at least partly polymerized,
   the cathode material is $A_zMXO_4$ wherein A is Li, alone or partially replaced by at most 10% of Na and/or K; $0 \leq z \leq 1$, M is at least 50% of Fe(II) or Mn(II) or mixture thereof; and $XO_4$ is $PO_4$, alone or partially replaced by at most 10 mol % of at least one group selected from $SO_4$ and $SiO_4$, and
   the monomer material consists of monomers of at least one of pyrrole, aniline, thiophene, phenyl mercaptan, furan, phenol, ethylenedioxythiophene and styrenesulfonate.

2. The cathode of claim 1, wherein the cathode material comprises LFP ($LiFePO_4$).

3. The cathode formulation of claim 1, further comprising a carbon coating.

4. The cathode of claim 1, wherein at least one ring in the monomers is substituted with at least one of: one or more straight, branched or bridged alkyl, alkenyl, oxa-alkyl, oxa-alkenyl, aza-alkyl, aza-alkenyl, thia-alkyl, thia-alkenyl, sila-alkyl, sila-alkenyl, aryl, aryl-alkyl, alkyl-aryl, alkenyl-aryl, dialkylamino and dialkylazo compounds comprising about 1-30 carbon atoms.

5. The cathode of claim 1, wherein the binder material consists of at least one of: carboxymethyl cellulose (CMC), polyvinylidene difluoride (PVDF), polyacrylic acid (PAA), polyethylene oxide (PEO), polyvinyl alcohol (PVA) and alginate.

6. The cathode of claim 1, comprising 80-90% of the cathode material, 1-10% of the binder material and 1-10% of the monomer material.

7. The cathode of claim 1, comprising 90-98% of the cathode material, 1-5% of the binder material and 1-5% of the monomer material.

8. A cell comprising the cathode of claim 1.

9. A cell comprising:
   an anode,
   electrolyte,
   a separator, and
   a cathode comprising:
   cathode material having an olivine-based structure,
   binder material, and
   a conductive polymer formed during at least a first charging cycle of the cell from monomer material selected to polymerize into the conductive polymer upon partial delithiation of the cathode material,
   wherein:

the monomer material is in monomer form in the cathode in its pristine form prior to the first charging cycle of the cell, the partial delithiation is carried out electrochemically during the first charging cycle of the cell, following the first charging cycle of the cell, the monomer material is at least partly polymerized, the cathode material is $A_zMXO_4$ wherein A is Li, alone or partially replaced by at most 10% of Na and/or K; $0 \leq z \leq 1$, M is at least 50% of Fe(II) or Mn(II) or mixture thereof; and $XO_4$ is $PO_4$, alone or partially replaced by at most 10 mol % of at least one group selected from $SO_4$ and $SiO_4$, and the monomer material consists of monomers of at least one of pyrrole, aniline, thiophene, phenyl mercaptan, furan, phenol, ethylenedioxythiophene and styrenesulfonate.

10. The cell of claim 9, having a charging curve, in at least a first charging thereof, which comprises a local peak at a specified potential which corresponds to a polymerization reaction of the monomer material in presence of the partially delithiated cathode material.

11. A method comprising configuring a cathode made of cathode material having an olivine-based structure for in-situ polymerization, by adding to the cathode material monomer material selected to polymerize into a conductive polymer upon partial delithiation of the cathode material during at least a first charging cycle of a cell with the cathode, wherein the monomer material is in monomer form in the cathode in its pristine form prior to the first charging cycle of the cell, the partial delithiation is carried out electrochemically during the first charging cycle of the cell, following the first charging cycle of the cell, the monomer material is at least partly polymerized, the cathode material is $A_zMXO_4$ wherein A is Li, alone or partially replaced by at most 10% of Na and/or K; $0 \leq z \leq 1$, M is at least 50% of Fe(II) or Mn(II) or mixture thereof; and $XO_4$ is $PO_4$, alone or partially replaced by at most 10 mol % of at least one group selected from $SO_4$ and $SiO_4$, and the monomer material consists of monomers of at least one of pyrrole, aniline, thiophene, phenyl mercaptan, furan, phenol, ethylenedioxythiophene and styrenesulfonate.

12. The method of claim 11, further comprising polymerizing the monomers during the at least first charging cycle of the cell.

13. The method of claim 11, further comprising operating the cell at a charging and/or discharging rate of at least 5 C.

* * * * *